US006400057B2

(12) United States Patent
Vesper et al.

(10) Patent No.: US 6,400,057 B2

(45) Date of Patent: Jun. 4, 2002

(54) SLIP-RING CONFIGURATION IN ELECTRIC MOTORS AND GENERATORS, SLIP-RING BODY AND METHOD FOR RETOOLING SLIP-RING BODIES

(75) Inventors: Wolfgang Vesper, Bonn; Klaus Stadie, Wachtberg; Ingolf Hahn, Bonn; Aloysius Meyer, Heroldbach, all of (DE)

(73) Assignees: SGL Carbon AG, Meitingen; Siemens Aktiengesellschaft, Munich, both of (DE)

( * ) Notice: Subject to any disclaimer, the term of this patent is extended or adjusted under 35 U.S.C. 154(b) by 0 days.

(21) Appl. No.: 09/783,182

(22) Filed: Feb. 14, 2001

(30) Foreign Application Priority Data

Feb. 25, 2000 (DE) .......................................... 100 09 007

(51) Int. Cl.[7] ................................................ H02K 39/08

(52) U.S. Cl. .......................................... 310/232; 310/45

(58) Field of Search .......................... 310/232, 45, 219, 310/228, 233, 237

(56) References Cited

U.S. PATENT DOCUMENTS 3,668,451 A * 6/1972 McNab ....................... 310/248
3,886,386 A * 5/1975 Hilling ....................... 310/248
4,314,172 A * 2/1982 Diepers ...................... 310/248
4,349,760 A * 9/1982 Diepers ...................... 310/248
4,361,775 A * 11/1982 Dieper et al. ............... 310/248

FOREIGN PATENT DOCUMENTS

DE 248 909 A1 8/1987
DE 258 687 A1 7/1988

OTHER PUBLICATIONS

H. Wagner et al.: "Das im VEB Elektromotorenwerk Dessau entwickelte "Carbo–System" zur Übertragung der Erregerleistung auf das Polrad von Synchronmaschinen", VEM 1975, pp. 15–19, and English translation of relevant parts.

* cited by examiner

*Primary Examiner*—Nestor Ramirez
*Assistant Examiner*—Thanh Lam
(74) *Attorney, Agent, or Firm*—Laurence A. Greenberg; Werner H. Stemer; Ralph E. Locher

(57) ABSTRACT

A slip-ring configuration for electric motors and generators is provided, in which brushes made of carbon materials and slip rings of a slip-ring body are electrically conductively connected to each other. The slip rings include metallic rings of standard construction as a slip-ring base and an electrically conductive sliding layer made of a graphite material. The sliding layer has a thickness which amounts to a maximum of 11% of a radius of the slip ring and is electrically conductively fastened to the periphery of the metallic slip-ring base by gluing. A method for retooling slip-ring bodies having metallic slip rings includes machining the metallic slip rings and gluing on a sliding layer.

15 Claims, 2 Drawing Sheets

SLIP-RING CONFIGURATION IN ELECTRIC MOTORS AND GENERATORS, SLIP-RING BODY AND METHOD FOR RETOOLING SLIP-RING BODIES

BACKGROUND OF THE INVENTION

Field of the Invention

The invention relates to slip-ring configurations for electrical machines, such as electric motors and generators, having brushes made of carbon materials and slip-ring bodies, wherein the brushes are electrically conductively connected to slip rings of the slip-ring bodies. The invention also relates to a slip-ring body and a method for retooling slip-ring bodies.

Electric motors and generators with which electrical energy is converted into rotational energy or, conversely, rotational energy is converted into electrical energy, require a current supply to a rotatably disposed coil, which is connected in a force-locking or form-locking manner to a rotating shaft. A form-locking connection is one which connects two elements together due to the shape of the elements themselves, as opposed to a force-locking connection, which locks the elements together by force external to the elements. That usually takes place by way of slip rings which are connected to the rotating shaft, concentric therewith and conductively connected to stationary brushes, or by way of pairing brushes with so-called commutators or collectors. In addition to producing an electrical connection between the stationary part and the rotating part of the electrical machine, the commutators or collectors also effect commutation (in direct-current machines).

Usually, the slip rings and commutators are formed of metals such as copper or copper alloys such as, for example, bronze, tin bronzes, nickel bronze, silver or steel. The slip rings are connected by insulating fastenings to a hub (rotating shaft) to form slip-ring bodies, which are insulated with respect to the hub and with respect to each other. Electrically conductive brushes are disposed stationarily along the circumference of the slip rings and are held in contact with the surface of the slip rings by spring force. In the case of alternating-current motors and generators, slip rings are required individually or plurally for each phase.

The sliding contacts (brushes) generally are formed of carbon materials, possibly in combination with metals, for example metal graphite. In order to produce metal graphite, mixtures of metal powders, in particular copper, tin or lead, are pressed with graphite, in particular natural graphite, and subsequently hardened by calcining or sintering.

In the case of all of those material pairings, wear results from reciprocal movement as well as from transmission of somewhat high currents, in which case dust can form from abrasion. On one hand, that can lead to shortening of a creepage path because of dirt accumulation and thus to arcing. On the other hand, an eroding of contacting layers results. There is a necessity for replacing the brushes and subsequent treatment of a surface of the slip rings (machining or stripping off of defective spots such as grooves or the like). In that connection, additional maintenance intervals result, which are shorter than maintenance intervals of (roller) bearings, something which causes substantially increased maintenance costs, above all as a result of additional down-times.

It is therefore desirable to keep the abrasion as low as possible and thus to lessen the frequency of the maintenance work caused as a result, or to make it at most the same as the frequency of the maintenance work for the bearings and/or other wearing parts.

It is known from East German Patent DD 258 687 A1 and from a publication entitled VEM Journal 1975, pages 15 ff, that wear is very low in the case of a pairing of graphite brushes with slip rings made of graphite. However, that system has the disadvantage of only permitting small currents to be conducted through the graphite body of the slip rings because of its specific resistance, which is relatively high in comparison with metals. When high currents are conducted, the ohmic heat is unacceptably high. That can lead to damage to the system. In a slip ring, the introduction or removal of the current takes place by way of a metal conductor which extends parallel to the axis of rotation in such a manner that it is laterally offset with respect thereto and is electrically conductively connected to the body of the slip ring. The resistance inside a graphite slip ring is of a similar magnitude to the contact resistance between a slip ring and a brush. In the case of a constant induced current in the coil, that leads to periodic voltage fluctuations in a generator. In a motor, it leads to an uneven torque, depending on the path length of the current and thus the active resistance in the slip ring.

Another construction is known from East German Patent DD 248 909 A1. A slip ring having a metallic slip-ring base and a carbon sliding ring soldered onto it is described therein. The slip-ring base is provided with hollow spaces in order to be able to remove waste heat by ventilation on all sides. The side of the carbon sliding ring that faces the metallic slip-ring base has to be metallized in order to ensure a low contact resistance and permit a soldered joint. Thermal stresses occur as a result of the strong heating of the structure by the ohmic dissipated energy, as well as during soldering. An outer portion of the metallic slip-ring base is therefore preferably provided with recesses for compensation of thermal stresses.

SUMMARY OF THE INVENTION

It is accordingly an object of the invention to provide a slip-ring configuration in electric motors and generators, a slip-ring body and a method for retooling slip-ring bodies, which overcome the hereinafore-mentioned disadvantages of the heretofore-known devices and methods of this general type, which on one hand lead to as little wear as possible and which on the other hand allow a sufficiently high current load, in order to permit systems of that kind to also be used in the high-current range without an occurrence of strong temperature rises known from the prior art. A further object is to be able to retrofit existing machines having metallic slip rings, in such a way that wear becomes less, with as few parts as possible needing to be replaced.

With the foregoing and other objects in view there is provided, in accordance with the invention, a slip-ring configuration for electric motors and generators, comprising a slip-ring body having slip rings to be electrically conductively connected to brushes made of carbon materials. The slip rings each have a given radius and a metallic ring of standard construction acting as a slip-ring base with a periphery. There is at least one electrically conductive sliding layer made of a graphite material. The at least one sliding layer has a thickness amounting to a maximum of 11% of the given radius and each of the at least one sliding layer is electrically conductively fastened to the periphery of the metallic slip-ring base of a respective one of the slip rings by gluing.

Accordingly, this object is achieved by a slip-ring construction which includes a metallic ring of standard construction as a slip-ring base and a sliding layer glued onto this slip-ring base. The sliding layer preferably is formed of a carbon material. If a carbon material is used, it is advantageous to use a graphite material, particularly preferably an isostatically pressed graphite material. Furthermore, the flexural strength of the graphite material should preferably amount to at least 30 MPa (=30 $N/mm^2$) in order to ensure that the layer thickness of the carbon material can be kept sufficiently small. The result of this construction is, on one hand, that the contact-surface pairing has minimal wear, because the material of the friction partner of the brushes can be chosen in such a way that the abrasion between these materials which are moved against each other is considerably lower than that between a pairing of metals or a pairing with metal and carbon material for the brushes. On the other hand, as a result of this construction, the contact resistance between the metallic base of the slip ring and the sliding layer is centrosymmetrical.

In accordance with another feature of the invention, not all of the slip rings of the slip-ring body are provided with the sliding layer.

As is conventional to a person skilled in the art, the configuration formed of the hub, the insulator (preferably the insulating covering in the form of a lateral cylinder surface) and the slip rings, which in the case of the invention are made up of the metallic slip-ring base and the sliding layer, is referred to herein as the slip-ring body.

The thickness of the sliding layer is upwardly limited by its conductivity (the thicker the sliding layer, which is poorly conductive in comparison with metals, the higher the resistance between the terminal lead, which is conductively connected to the metallic slip-ring base, and the connecting lead at the brushes). It has proven advantageous to ensure that the thickness of the sliding layer is not greater than 11% of the radius of the outer cylindrical or shell surface of the sliding layer.

The metallic slip-ring base is usually a squat cylindrical supporting ring which can be constructed in such a way that it is solid, with (mainly circular) recesses, or a spoked wheel. It is also possible, and preferred, for the width of the slip-ring base in the vicinity of the outer cylindrical or shell surface to be greater in this region than in the rest of the ring. The slip-ring base is thus given the appearance of a flat ring (which can also have recesses), on the periphery of which a wide (in the direction parallel to the axis) lateral cylinder surface like a collar is preferably formed. A sliding layer with a constant thickness is electrically conductively fastened on the (outer) lateral surface of this slip-ring base. This fastening is preferably produced by conductive gluing. The advantage of gluing is that the electrical connection has a contact area which is as large as possible. That lowers the contact resistance and divides the force between the two materials onto an area which is as large as possible. Heating to temperatures at which solder melts, which is otherwise required in the case of the production of a soldered joint, is dispensed with by gluing. When soldering, particular safety measures, such as dismantling or putting on a thermal shield, are namely required in order to avoid damage to the slip-ring base.

In accordance with a further feature of the invention, the sliding layer is formed of an electrically conductive graphite material. Preferably, a graphite material having a flexural strength of at least 30 MPa is used as the material for the sliding layer. Furthermore, isostatically pressed graphite material is preferably used. The thickness of the sliding layer should be kept as low as possible because of the specific resistance which is higher in comparison with the metallic slip-ring base. In this connection, however, it is to be taken into account that, on one hand, the mechanical stability of the sliding layer decreases with smaller thickness. On the other hand, the abrasion in connection with the brushes (that are usually and preferably formed of carbon materials) is to be determined by the suitable selection of the material and its thickness in such a way that maintenance intervals, which become necessary because of the renewing of the sliding layer, are equal to or greater than the average rolling-bearing lifetime. Therefore, the thickness of the sliding layer should not amount to more than 11% of the outer radius of the slip ring (i.e. of the outer radius of the sliding layer). Preferably, the thickness of the sliding layer is 10% or less of this radius, in particular 8% or less, with proportions of 6% and below or 4% and below being particularly preferred.

Conductive adhesives are used in order to glue the sliding layer and the metallic slip-ring base together. These adhesives are preferably to be chosen in such a way that their temperature stability is so great that a firm gluing of the sliding layer onto the metallic slip-ring base is also ensured at the temperatures of the slip ring that occur during the operation of the slip-ring configuration. Preferably, however, adhesives which do not have a suitable inherent conductivity, although to which a metal powder, preferably copper powder, is added, are also used. It is particularly preferable if after the depositing of the adhesive layer, the metal powder is scattered over the coated surfaces in order to obtain an electrically conductive adhesive connection. The metal powders being used preferably have a granulation of 0.01 mm to 0.2 mm. In particular, epoxy-resin adhesives, phenolic-resin adhesives, cyanate-ester-resin adhesives as well as adhesives based on polyurethane resins, polyester resins and amine resins, are counted among the adhesives being used. It is particularly preferable if phenolic-resin adhesive is used for the slip rings in accordance with the invention. The layer thickness of the adhesive on the metal surface of the slip-ring base or on the inside surface of the sliding layer preferably amounts to between 0.02 mm and 0.2 mm, particularly preferably between 0.05 mm and 0.1 mm. In the gluing process, sliding-layer segments are placed precisely onto the supporting slip-ring base and pressed on with even pressure. In this connection, a gap width between individual segments of the sliding layer is to be kept as small as possible.

In accordance with an added feature of the invention, graphite brushes are used as the sliding partner for the sliding layer of the slip rings, i.e. brushes made of carbon materials with a graphitic character. In particular, electrographite and burnt carbon materials which contain natural graphite are counted among these materials.

The fact that the sliding layer, which preferably is formed of the above-mentioned rigid carbon material, can be renewed without difficulty when necessary, is to be mentioned as a further advantage of this construction. In order to do this, it is only necessary to machine or strip off the remaining sliding layer and the adhesive layer down to the metal, whereupon a new sliding layer can then be applied. Changes in the brush position during this overhaul are not required in this case. In the case of a pure metal embodiment, the slip ring has to be reworked when worn, without going below a minimum diameter, or the entire slip ring has to be exchanged, in which case the brushes also have to be renewed.

The partial or complete retrofitting of existing machines having purely metallic slip rings is to be carried out without difficulty in such a way that the metallic contact layer on the outer cylindrical or shell surface of the existing slip rings in the slip-ring body is prepared, preferably worn down, particularly preferably by machining or stripping off. This is done in such a way that the sliding layer can be applied in the required thickness and connected to the remaining metallic slip-ring base by gluing. The sliding layer can then be reworked if necessary in order to remove surface irregularities, for example by stripping off or grinding. The advantage of the embodiment in accordance with the invention emerges in particular in the case of this retrofitting, because the thickness (in the radial direction) of the gliding layer of metallic slip rings is usually great enough to be stripped off or machined to the required diameter without a loss of stability. This applies in particular to metallic slip rings which have two layers in the radial direction, a metallic supporting layer and a separate outer gliding layer.

It is of particular advantage to prepare the metallic slip rings of an existing machine (for example by grinding, turning or milling) in such a way that at least at one of the edges of the outer cylindrical or shell surface of the remaining metallic slip-ring base, a projection (in the direction of the increasing radius) remains in each case which is preferably 0.5 mm to 5 mm wide, in particular 1 mm to 3 mm wide, and 0.5 mm to 3 mm high, preferably 1 to 2 mm high. The sliding layer is glued into the cylindrical groove which comes about in this way, in such a way that the sliding layer ends at the projections or preferably projects above them by up to 5 mm, in particular up to 3 mm.

In the configuration in accordance with the invention, the entire slip-ring body can be clamped for overhaul or renewal of the sliding layer, the slip rings are stripped off or machined down to the metallic base, and the sliding layer can be replaced (simultaneously with one or more slip rings).

In accordance with an additional feature of the invention, the sliding ring can be formed of a closed ring. However, it is preferred for the sliding layer to be made up of a plurality of segments, which are cut from one or more graphite rings. In that case they are applied to the carrier in at least two segments, particularly preferably in at least three segments.

In accordance with yet another feature of the invention, in this connection, the joint between two adjoining sliding-layer segments is not made parallel to the axis of rotation (i.e. at right angles to the tangent), but instead at an angle to the tangent of a maximum of 75°, preferably a maximum of 60°, and particularly preferably up to 45°. The word "tangent" is defined and will be used as follows: "A tangent is that straight line which borders on the outer cylindrical or shell surface of the slip-ring and passes perpendicular to the rotational axis of the electrical machine."

Therefore, in accordance with a concomitant feature of the invention, the sliding layer is applied in one piece in the form of a ring and the latter is slit circumferentially at an angle $\beta$ with respect to the tangent. That angle is preferably sized in such a way that the slit extends at least once around the entire circumference of the sliding layer. If the sliding layer is applied in more than one segment, it is advantageous for these segments not to be sized with the same (arc) length. Instead, the (arc) length of the longest segment should be at least 110% of the length of the other (or second-longest) segment. The thickness of the sliding layer amounts to up to 11% of the outer radius of the slip ring, preferably a maximum of 5 mm and in particular 4 mm and less.

Other features which are considered as characteristic for the invention are set forth in the appended claims.

Although the invention is illustrated and described herein as embodied in a slip-ring configuration in electric motors and generators, a slip-ring body and a method for retooling slip-ring bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
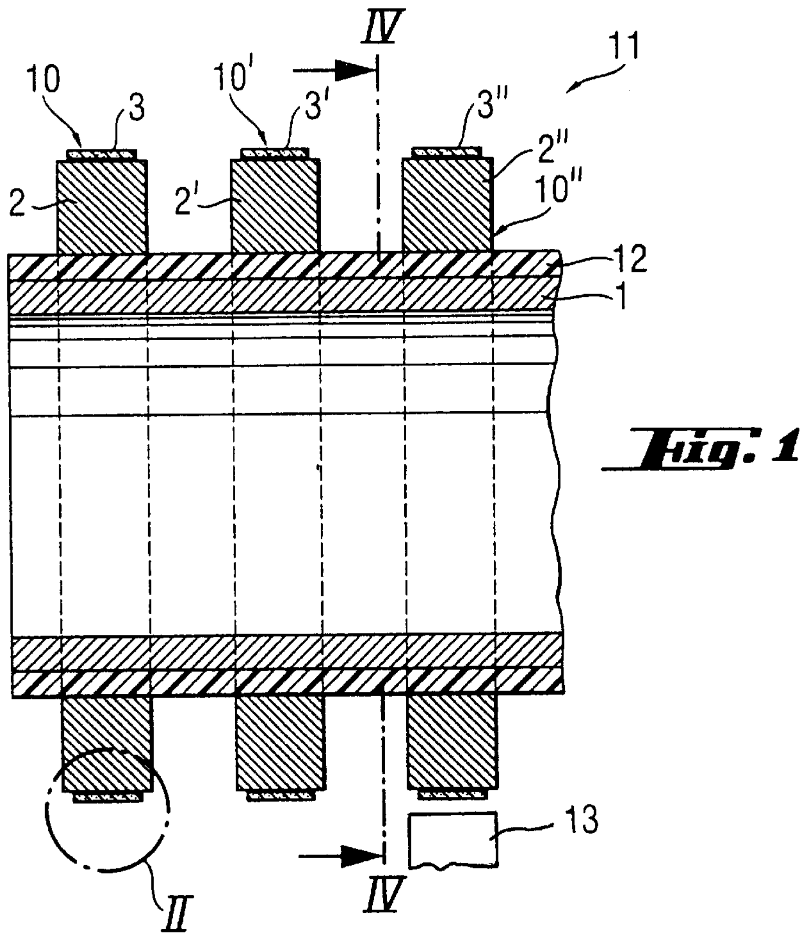
FIG. 1 is a fragmentary, diagrammatic longitudinal-sectional view of a slip-ring body.
Figure 2:
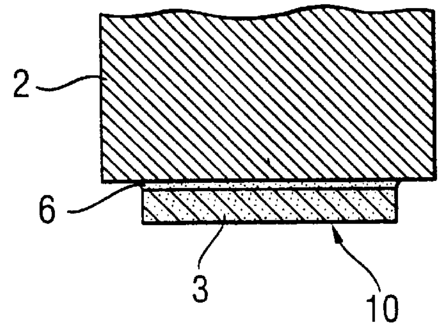
FIG. 2 is an enlarged, fragmentary view of a portion II of FIG. 1.

Referring now to the figures of the drawings in detail and first, particularly, to FIG. 1 thereof, there is seen a slip-ring body 11 according to the invention having a total of three slip rings 10, 10', 10". The slip rings 10, 10', 10" are to be electrically conductively connected to brushes 13 made of carbon or graphite materials, although only one brush is shown. The slip rings are shown in a section taken through the slip-ring body 11 along a plane parallel to an axis of rotation. Metallic rings 2, 2', 2" that are provided as a slip-ring base, are fastened to an insulating layer 12 which is mounted on a hub 1. A respective sliding layer 3, 3', 3" in the form of a cylindrical ring is glued onto a lateral surface of each of these metallic rings 2, 2', 2" with the aid of an electrically conductive adhesive. This construction can be seen from FIG. 2, which is an enlargement of a section of FIG. 1. In this case, a metallic portion of the slip-ring base 2 is shown, on which the annular sliding layer 3 is secured by an electrically conductive adhesive 6.

Figure 3:
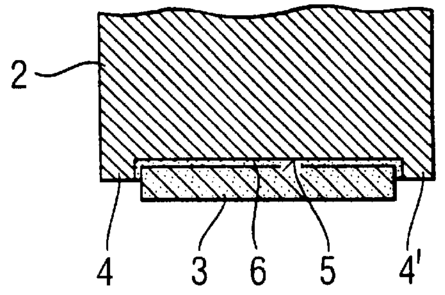
FIG. 3 is an enlarged, fragmentary view similar to FIG. 2, of an embodiment which is an alternative to FIG. 1.

FIG. 3 illustrates the above-mentioned preferred embodiment, in which the slip-ring base 2 is constructed in such a way that a respective projection 4, 4' remains at edges of its outer cylindrical or shell surface. This is a modified embodiment of the embodiment shown in FIG. 2 and FIG. 1. In contrast to the construction shown in FIG. 1, in this case the respective projection 4 and 4' has been left at both edges of the outer cylindrical or shell surface of the slip-ring base 2. As a result, a groove 5 is formed in the center of the outer limiting surface of the slip-ring base 2, into which the sliding layer can be inserted in such a manner that it is flush. The electrically conductive adhesive 6 is brushed onto the slip-ring base 2 at the base of the groove 5 and the sliding layer 3 is applied and glued to the slip-ring base 2.

Figure 4:
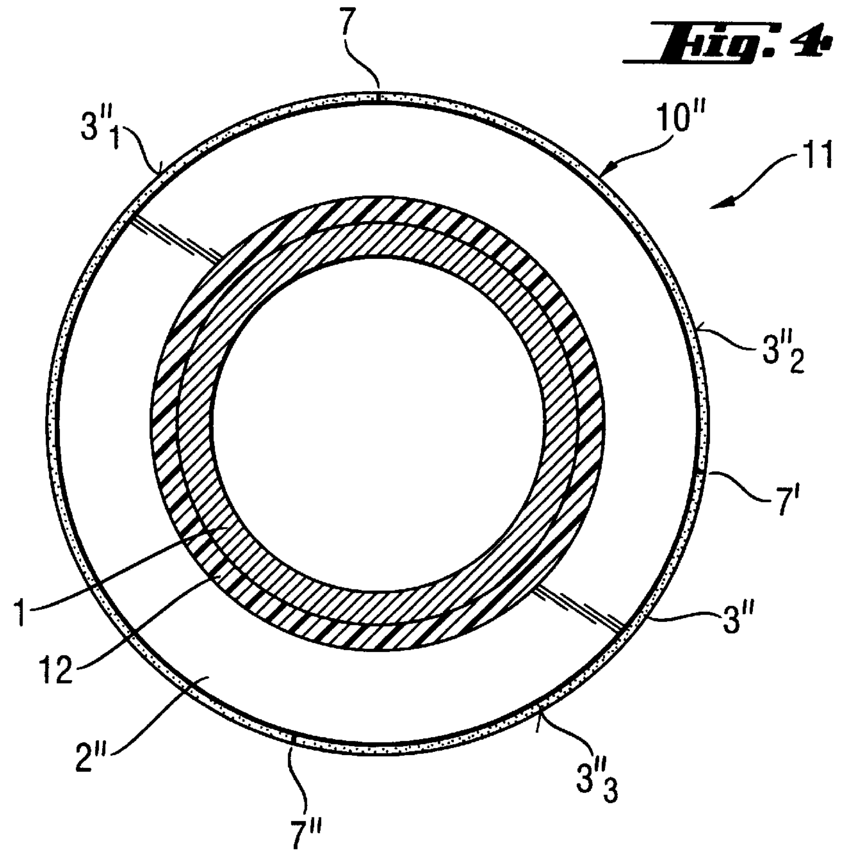
FIG. 4 is a cross-sectional view taken along a line IV—IV of FIG. 1, in the direction of the arrows.

FIG. 4 shows a section taken along a line IV—IV of FIG. 1. The sliding layer 3" is glued onto the annular slip-ring base 2" which is fastened to the insulating layer 12 over the hub 1. A multi-part construction of the sliding layer 3" which can be seen in FIG. 4 provides a three-part embodiment with sliding-layer segments 3"$_1$, 3"$_2$, 3"$_3$ and joint locations 7, 7' and 7".

Figure 5:
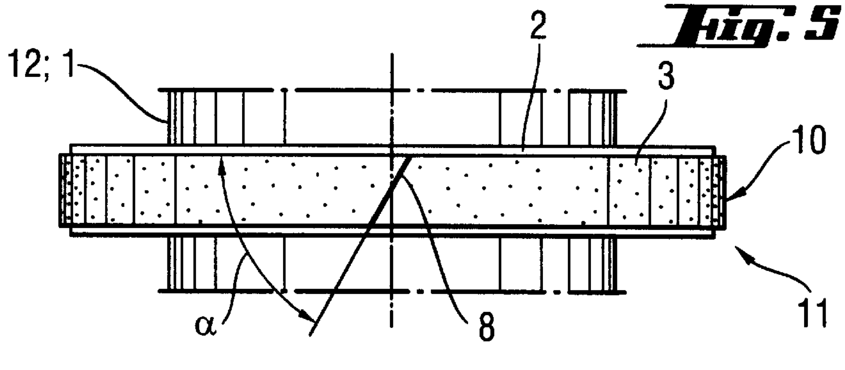
FIG. 5 is a lateral plan view of a slip-ring body in accordance with FIG. 4.

FIG. 5 shows a plan view of a slip ring of this type. The viewing direction of the observer in FIG. 5 is at right angles to the axis and at right angles to the diameter of the slip ring. The sliding layer 3 is glued onto the slip-ring base 2 in a plurality of segments and a joint 8 between two segments of the sliding layer is visible in FIG. 5. An angle $\alpha$ of the joint 8 with respect to the tangent is 60°.

Figure 6:
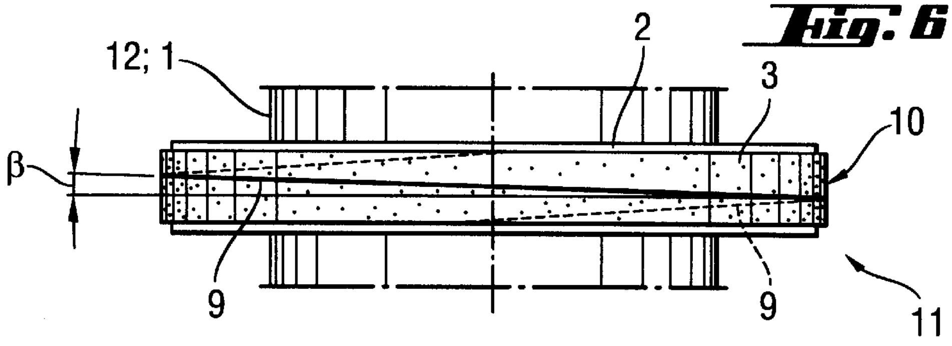
FIG. 6 is a plan view of a slip-ring body in accordance with an embodiment that is an alternative to the embodiment of FIG. 4.

Finally, FIG. 6 shows a further preferred embodiment in a plan view similar to FIG. 5, in which the ring 3 forming the sliding layer is slit. An angle $\beta$ of a slit 9 with respect to the tangent is preferably chosen in such a way that the slit extends along a spiral line on a lateral surface of the cylindrical sliding layer and the length of the slit is greater than the circumference of the lateral surface. The advantage of this embodiment is that the ring can be expanded in order to be applied to the slip-ring base 2 which is fastened to the hub 1. In this case, if applicable, the ring 3 can be inserted into the groove 5 even over a raised projection 4 or 4' of the slip-ring base (which is provided in accordance with FIG. 3) without the danger of breaking. The slit ring or sliding layer 3 is subsequently glued to the slip-ring base 2 so that it is flush and the width of the slit 9 is as small as possible. The acute angle $\beta$ (small angle) of the slit 9 with respect to the tangent further minimizes possible irregularities or joints and thus reduces abrasion.

The invention will be further explained by the following examples:

Comparative Example

A standard 6 kV-electric motor (type "1LS1 456-4HA60-Z" from Siemens AG, No. 904 068) having slip rings in accordance with the prior art made of steel X10Cr13 and associated optimized brushes, namely metal graphite brushes "RC53" from the company SGL CARBON GmbH, was used during operation with rated load. The temperature of the supply air, at the winding, in the slip ring space, at the brushes and at the slip rings, was determined. The abrasion at the brushes and the slip rings was determined.

Example

The slip-ring body of the comparative example (with a diameter of 280 mm) was clamped centrally onto a turning lathe and the slip rings made of steel were stripped off or machined to an outer diameter of 270 mm. Three ring segments being formed of an isostatically pressed graphite of the type 300 from the company SGL CARBON GmbH were used having the dimensions: inside diameter 270 mm, outside diameter 282 mm, width 30 mm. The ring segments were glued onto the smooth surface which resulted from stripping off, with the aid of a phenolic resin as an adhesive that was filled with copper powder of the type FFL from the company Norddeutsche Affinerie (composition: 50% by weight resin, 50% by weight copper powder). The joint locations between the segments were made with an inclination of 60°. The slip-ring body was once again clamped centrally and stripped off or machined to 280 mm outer diameter. The slip-ring body was reinstalled in the motor. Apart from this, the brushes were exchanged with graphite brushes of the type RE65 from the company SGL CARBON GmbH. The same measurements as in the comparative example were made. The results are summarized in the table below.

| | Comparison | Example |
|---|---|---|
| Brush | RC53 | RE65 |
| Sliding layer | steel X10Cr13 | isographite 300 |
| Brush wear | 0.3 mm/100 h | <0.05 mm/100 h |
| Ring wear | not measurable | not measurable |

Extensive comparisons between the two configurations with different operating times and different load produced the result that the temperature of the brushes in the embodiment in accordance with the invention was on average 13 to 23° C. lower than that of the comparison, and the temperature of the slip rings was on average 12 to 18° C. lower than in the comparison. The lifetime of the components of the electrical machines, such as the bearings, for example, can be increased due to the lower temperature load in the slip-ring configuration in accordance with the invention.

In comparison, in the case of a comparatively high running time (a few hundred hours), a clear eroding of the brushes of the conventional configuration (comparison) was established, while the configuration in accordance with the invention did not show any measurable brush wear of the brushes being used. The wear at the slip rings was not measurable in the case of this short running time.

Furthermore, tests with the comparative slip-ring configuration and the slip-ring configuration in accordance with the example were carried out on test stands in order to test the systems under extreme loads. In this connection, the slip-ring configurations were mounted on a 710 KW motor and turn-on tests in the form of run-ups with different rotor currents were carried out, i.e. a very high performance was demanded of them for a short time. In the case of the comparative slip-ring configuration in accordance with the background prior art, these tests were able to be carried out up to a 3.2-fold loading of the rated current, something which corresponds to a current density per brush of approximately 32 A/cm$^2$. However, in this connection, in the standard embodiment, both the slip rings and the brush gliding surfaces showed heavy damage as a result of melting (sparking of the brushes was observed). The slip-ring configuration according to the invention in accordance with the Example was able to be carried out up to an approximately 3.5-fold loading of the rated current, something which corresponds to a current density over the slip-ring configuration in accordance with the invention of 40 A/cm$^2$. Even at this still higher loading, no damage to the slip rings and brushes (sparking of the brushes) of the configuration in accordance with the invention could be observed.

A fundamental advantage of the slip-ring configuration in accordance with the invention resides in the fact that the slip rings can be used almost without exchange. On one hand, it is possible, if necessary, to only renew the sliding layer, although without significantly affecting the metallic slip-ring base. On the other hand, the metallic slip rings used heretofore had to be renewed over time, because in the case of each required maintenance of the electric machines for exchanging the bearings, they had to be stripped off or machined in order to even out the formation of grooves on the slip ring surface.

We claim:

1. A slip-ring configuration for electric motors and generators, comprising:

a slip-ring body having slip rings to be electrically conductively connected to brushes made of carbon materials;

said slip rings each having a given radius and a metallic ring of standard construction acting as a slip-ring base with a periphery;

at least one electrically conductive sliding layer made of a graphite material;

said at least one sliding layer having a thickness amounting to a maximum of 11% of said given radius and said at least one sliding layer each electrically conductively fastened to said periphery of said metallic slip-ring base of a respective one of said slip rings by gluing.

2. The slip-ring configuration according to claim 1, wherein said sliding layer is formed of a material having a flexural strength of at least 30 MPa.

3. The slip-ring configuration according to claim 1, wherein said sliding layer is formed of an isostatically pressed graphite material.

4. The slip-ring configuration according to claim 1, wherein said sliding layer is formed of annular segments.

5. The slip-ring configuration according to claim 4, wherein said annular segments define joint locations between said annular segments forming an angle of maximally 75° relative to a tangent.

6. The slip-ring configuration according to claim 4, wherein said annular segments have different arc lengths and include a longest annular segment and a second-longest annular segment, and said arc length of said longest annular segment is at least 110% of said arc length of said second-longest annular segment.

7. The slip-ring configuration according to claim 1, wherein said slip-ring base has an outer surface with edges and a projection at least at one of said edges.

8. The slip-ring configuration according to claim 7, wherein said projection at least at one of said edges has a width of between 0.5 mm and 5 mm and a height of between 0.5 mm and 3 mm.

9. The slip-ring configuration according to claim 1, wherein said sliding layer includes a ring having a circumferential slit at an angle β relative to a tangent.

10. The slip-ring configuration according to claim 9, wherein said sliding layer has a circumference, and said angle β is dimensioned to cause said slit to extend at least once entirely around said circumference of said sliding layer.

11. The slip-ring configuration according to claim 1, including a temperature-stable adhesive gluing said sliding layer and said metallic slip-ring base together, said temperature-stable adhesive permitting a permanent connection of said sliding layer to said slip-ring base even during operation of the slip-ring configuration.

12. The slip-ring configuration according to claim 1, including an adhesive to which a metal powder is added, said adhesive gluing said sliding layer and said metallic slip-ring base together.

13. The slip-ring configuration according to claim 1, wherein the brushes are graphite brushes.

14. The slip-ring configuration according to claim 1, wherein at least one of said slip rings is not glued to a sliding layer made of a graphite material.

15. A slip-ring body, comprising:

slip rings to be electrically conductively connected to brushes made of carbon materials;

said slip rings each having a given radius, a metallic ring of standard construction acting as a slip-ring base with a periphery, and an electrically conductive sliding layer, said sliding layer of said slip-ring base of at least one of said slip rings being a sliding layer made of a graphite material;

said sliding layer having a thickness amounting to a maximum of 11% of said given radius and said sliding layer electrically conductively fastened to said periphery of said metallic slip-ring base by gluing.

* * * * *